United States Patent
Gandhi

(10) Patent No.: US 10,200,907 B2
(45) Date of Patent: Feb. 5, 2019

(54) SYSTEMS AND METHODS FOR DYNAMIC UPLINK AND DOWNLINK RATE ASSIGNMENT IN A WIRELESS COMMUNICATION NETWORK

(71) Applicant: Alcatel-Lucent USA Inc., Murray Hill, NJ (US)

(72) Inventor: Asif D. Gandhi, Edison, NJ (US)

(73) Assignee: Nokia of America Corporation, Murray Hill, NJ (US)

(*) Notice: Subject to any disclaimer, the term of this patent is extended or adjusted under 35 U.S.C. 154(b) by 87 days.

(21) Appl. No.: 15/151,834

(22) Filed: May 11, 2016

(65) Prior Publication Data

US 2017/0332270 A1 Nov. 16, 2017

(51) Int. Cl.
| | |
|---|---|
| *H04W 28/02* | (2009.01) |
| *H04B 7/06* | (2006.01) |
| *H04L 5/00* | (2006.01) |
| *H04W 28/04* | (2009.01) |
| *H04L 1/00* | (2006.01) |
| *H04W 24/00* | (2009.01) |
| *H04L 12/811* | (2013.01) |

(52) U.S. Cl.
CPC ...... *H04W 28/0236* (2013.01); *H04B 7/0632* (2013.01); *H04L 1/00* (2013.01); *H04L 5/0055* (2013.01); *H04L 47/38* (2013.01); *H04W 24/00* (2013.01); *H04W 28/0247* (2013.01)

(58) Field of Classification Search
CPC .............. H04W 28/04; H04W 28/0236; H04L 5/0055; H04B 7/0632
See application file for complete search history.

(56) References Cited

U.S. PATENT DOCUMENTS

| | | | | |
|---|---|---|---|---|
| 7,764,727 B2* | 7/2010 | Ye | ............... | H04L 1/0003 |
| | | | | 332/103 |
| 7,983,230 B1* | 7/2011 | Li | ............... | H04W 52/262 |
| | | | | 370/338 |
| 9,451,555 B2* | 9/2016 | Zeira | ............... | H04W 52/16 |
| 2002/0021686 A1* | 2/2002 | Ozluturk | ............... | G06F 13/374 |
| | | | | 370/342 |
| 2006/0009250 A1* | 1/2006 | Lee | ............... | H04W 52/10 |
| | | | | 455/522 |
| 2008/0049706 A1* | 2/2008 | Khandekar | ............. | H04J 13/00 |
| | | | | 370/342 |
| 2008/0081655 A1* | 4/2008 | Shin | ............... | H04W 52/08 |
| | | | | 455/522 |
| 2008/0188184 A1* | 8/2008 | Nogami | ............... | H04L 1/0003 |
| | | | | 455/67.11 |

(Continued)

*Primary Examiner* — Rasheed Gidado
(74) *Attorney, Agent, or Firm* — Harness, Dickey & Pierce, P.L.C.

(57) ABSTRACT

In one example embodiment, a network control node includes a memory having computer-readable instruction stored therein, and a processor. The processor is configured to execute the computer-readable instructions to determine an uplink correction parameter based on at least one of network loading conditions and a modulation coding scheme used for transmission of data packets on an uplink channel from a user equipment to the network control node, determine a target signal to interference plus noise ratio (SINR) for the user equipment based on the uplink correction parameter, and adjust the modulation coding scheme based on the determined target SINR.

18 Claims, 21 Drawing Sheets

(56) References Cited

U.S. PATENT DOCUMENTS

| | | | |
|---|---|---|---|
| 2008/0194297 A1* | 8/2008 | Nose | H04B 17/336 455/561 |
| 2010/0098045 A1* | 4/2010 | Miyazaki | H04B 7/15557 370/342 |
| 2012/0140667 A1* | 6/2012 | Nakayama | H04J 11/005 370/252 |
| 2012/0140708 A1* | 6/2012 | Choudhury | H04W 72/082 370/328 |
| 2013/0209091 A1* | 8/2013 | Mateosky | H04B 10/07953 398/26 |
| 2014/0023020 A1* | 1/2014 | Yang | H04L 1/0026 370/329 |
| 2014/0024379 A1* | 1/2014 | Morimoto | H04W 36/30 455/437 |
| 2015/0282008 A1* | 10/2015 | Cao | H04W 4/005 370/310 |

\* cited by examiner

| UL_SINR (dB) | UL MCS |
|---|---|
| -2.5 | 1 |
| -2.0 | 2 |
| -1.4 | 3 |
| -0.4 | 4 |
| 0.0 | 5 |
| 0.9 | 6 |
| 1.9 | 7 |
| 2.7 | 8 |
| 3.2 | 9 |
| 4.3 | 10 |
| 5.1 | 11 |
| 6.0 | 12 |
| 7.0 | 13 |
| 7.9 | 14 |
| 8.5 | 15 |
| 9.3 | 16 |
| 9.8 | 17 |
| 11.0 | 18 |
| 11.5 | 19 |
| 13.5 | 20 |
| 14.5 | 21 |

UL_SINR TO UL MCS TABLE FOR LARGE PUSCH GRANTS

*FIG. 3A*

| UL_SINR (dB) | UL MCS |
|---|---|
| -2.0 | 1 |
| -1.3 | 2 |
| -1.0 | 3 |
| 0.0 | 4 |
| 0.6 | 5 |
| 1.5 | 6 |
| 2.2 | 7 |
| 2.9 | 8 |
| 3.8 | 9 |
| 4.6 | 10 |
| 5.2 | 11 |
| 6.1 | 12 |
| 7.0 | 13 |
| 8.0 | 14 |
| 8.9 | 15 |
| 9.2 | 16 |
| 9.6 | 17 |
| 11.0 | 18 |
| 12.1 | 19 |
| 13.4 | 20 |
| 15.1 | 21 |

UL_SINR TO UL MCS TABLE FOR SMALL PUSCH GRANTS

*FIG. 3B*

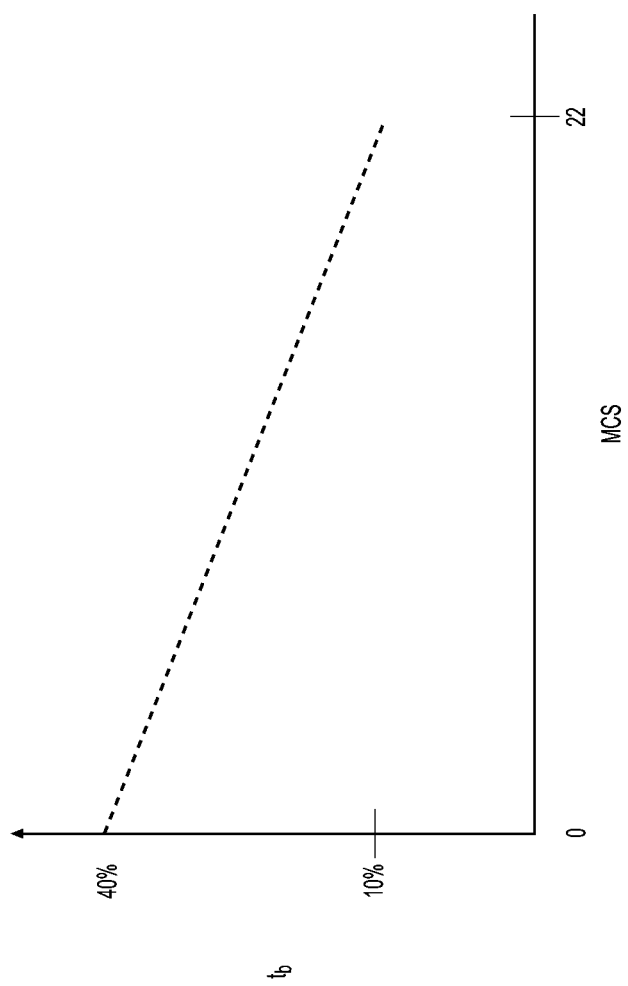

| CQI | ESTIMATED DL_SINR (dB) |
|---|---|
| 1 | -6.00 |
| 2 | -4.00 |
| 3 | -2.75 |
| 4 | -0.75 |
| 5 | 1.25 |
| 6 | 2.75 |
| 7 | 5.00 |
| 8 | 6.75 |
| 9 | 8.50 |
| 10 | 10.75 |
| 11 | 12.50 |
| 12 | 14.50 |
| 13 | 16.25 |
| 14 | 17.75 |
| 15 | 20.00 |

*FIG. 8*

| DL_SINR (dB) | DL MCS |
|---|---|
| -2.5 | 1 |
| -2.0 | 2 |
| -1.25 | 3 |
| -0.5 | 4 |
| 0.5 | 5 |
| 0.75 | 6 |
| 2.0 | 7 |
| 2.75 | 8 |
| 3.75 | 9 |
| 4.75 | 10 |
| 5.00 | 11 |
| 6.00 | 12 |
| 7.00 | 13 |
| 7.25 | 14 |
| 8.25 | 15 |
| 9.00 | 16 |
| 10.25 | 17 |
| 11.50 | 18 |
| 11.75 | 19 |
| 12.50 | 20 |
| 13.25 | 21 |
| 14.25 | 22 |
| 15.25 | 23 |
| 16.25 | 24 |
| 16.75 | 25 |
| 17.75 | 26 |
| 18.75 | 27 |
| 20.00 | 28 |

*FIG. 9*

| UI MCS | TARGET BLER |
|--------|-------------|
| 0-3    | 40%         |
| 4-6    | 35%         |
| 7-10   | 30%         |
| 11-14  | 25%         |
| 15-18  | 15%         |
| 19-22  | 10%         |
| 23-28  | 5%          |

*FIG. 12B*

| AVG. DL SINR (UE ESTIMATED) | RSRQ VALUE IN dB |
|---|---|
| 26.4 | -11.0 |
| 25.4 | -11.0 |
| 24.3 | -11.0 |
| 22.9 | -11.0 |
| 21.3 | -11.1 |
| 19.6 | -11.1 |
| 17.8 | -11.3 |
| 15.9 | -11.7 |
| 14.2 | -11.8 |
| 11.8 | -12.0 |
| 10.1 | -12.1 |
| 8.1 | -12.4 |
| 6.0 | -12.8 |
| 4.1 | -13.3 |
| 2.1 | -13.9 |
| 0.2 | -14.7 |
| -1.8 | -15.7 |
| -3.9 | -16.5 |
| -5.7 | -17.7 |
| -7.8 | -19.5 |
| -9.3 | -21.2 |

*FIG. 20*

SYSTEMS AND METHODS FOR DYNAMIC UPLINK AND DOWNLINK RATE ASSIGNMENT IN A WIRELESS COMMUNICATION NETWORK

BACKGROUND

In a wireless communication network such as a Long-Term Evolution (LTE) network, there are certain/fixed data rate assignments for uplink (UL) and downlink (DL) data transmission between a user equipment and a base station (eNodeB) serving the user equipment.

In LTE systems and for DL transmission, there are 29, from 0 up to 28, possible rate assignments, denoted as modulation coding schemes (MCS). Moreover, in LTE systems and for UL transmission, there are 23 MCSs, from 0 to 22. Currently, data rates are assigned based on user equipment (UE) feedback (e.g., a channel quality indication (CQI), a pre-coding matrix indication (PMI), a rank indication (RI), a sounding reference signal (SRS), and a hybrid automatic repeat request (HARQ) acknowledgement (ACK) and/or negative acknowledgement (NACK)). As part of this rate assignment, changing the UL data rate or DL data rate based on the HARQ ACK/NACK feedback, is called link adaptation. Currently implemented algorithms for link adaptation are independent of network loading conditions and/or the assigned MCS.

SUMMARY

Some example embodiments relate to methods and/or systems for dynamically/adaptively assigning data rates for uplink and downlink data transmission between a user equipment (UE) and a base station.

In one example embodiment, a network control node includes a memory having computer-readable instruction stored therein, and a processor. The processor is configured to execute the computer-readable instructions to determine an uplink correction parameter based on at least one of network loading conditions and a modulation coding scheme used for transmission of data packets on an uplink channel from a user equipment to the network control node, determine a target signal to interference plus noise ratio (SINR) for the user equipment based on the uplink correction parameter, and adjust the modulation coding scheme based on the determined target SINR.

In yet another example embodiment, the processor is configured to execute the computer-readable instructions to determine the network loading conditions as at least one of an interference to thermal noise (IoT) value for the user equipment, and a number of active users serviced by the network control node.

In yet another example embodiment, processor is configured to execute the computer-readable instructions to determine a step size as one of a linear, non-linear or piecewise linear functions of at least one of a plurality of IoT values and the number of active users, and determine the uplink correction parameter based on the determined step size and a previous value of the uplink correction parameter.

In yet another example embodiment, the processor is configured to execute the computer-readable instructions to determine whether the network control node has transmitted an acknowledgement message (ACK) or a negative acknowledgement message (NACK) in response to the data packet received from the user equipment, and determine the uplink correction parameter based on whether the network control node has transmitted an ACK or a NACK and the at least one of the network loading conditions and the modulation coding scheme.

In yet another example embodiment, if the processor determines that the network control node has transmitted an ACK, the processor is configured to execute the computer-readable instructions to determine the uplink correction parameter as a function of a step size, the step size being a function of the loading conditions.

In yet another example embodiment, if the processor determines that the network control node has transmitted a NACK, the processor is configured to execute the computer-readable instructions to determine the uplink correction parameter as a function of a step size, the step size being a function of the loading conditions and the modulation coding scheme.

In yet another example embodiment, the processor is configured to execute the computer-readable instructions to determine a target block error rate for the user equipment, determine the step size based on the target block error rate, and determine the uplink correction parameter based on the determined step size and a previous value of the uplink correction parameter.

In yet another example embodiment, the processor is configured to execute the computer-readable instructions to determine the target block error rate as a function of the modulation coding scheme, the modulation coding scheme being a modulation coding scheme previously assigned to the user equipment during a previous transmission of a data packet on the uplink channel.

In yet another example embodiment, the processor is configured to execute the computer-readable instructions to determine a sequence number of the NACK transmitted by the network control node to the UE in response to the data packet received on the uplink channel from the user equipment, and apply a corresponding weight from among a plurality of weights to the determined uplink correction parameter based on the sequence number of the NACK message.

In yet another example embodiment, the network node is an eNodeB, and the uplink channel is a physical uplink shared channel (PUSCH).

In one example embodiment, a network control node includes a memory having computer-readable instruction stored therein and a processor. The processor is configured to execute the computer-readable instructions to determine a downlink correction parameter based on at least one of network loading conditions and a modulation coding scheme used for transmission of data packets on a downlink channel from the network control node to a user equipment, determine a target signal to interference plus noise ratio (SINR) for the user equipment based on the downlink correction parameter, and adjust the modulation coding scheme based on the determined target SINR.

In yet another example embodiment, the processor is configured to execute the computer-readable instructions to determine the network loading conditions as at least one of an interference to thermal noise (IoT) value for the user equipment, and a number of active users serviced by the network control node.

In yet another example embodiment, the processor is configured to execute the computer-readable instructions to determine a step size as one of a linear, non-linear or piecewise linear functions of at least one of a plurality of IoT values and the number of active users, and determine the downlink correction parameter based on the determined step size and a previous value of the downlink correction parameter.

In yet another example embodiment, the processor is configured to execute the computer-readable instructions to determine whether an acknowledgement message (ACK) or a negative acknowledgement message (NACK) is received from the user equipment in response to the data packet transmitted to the user equipment, and determine the downlink correction parameter based on whether the network control node has received an ACK or a NACK from the user equipment and the at least one of the network loading conditions and the modulation coding scheme.

In yet another example embodiment, if the processor determines that an ACK has been received, the processor is configured to execute the computer-readable instructions to determine the downlink correction parameter as a function of a step size, the step size being a function of the loading conditions.

In yet another example embodiment, if the processor determines that a NACK is received, the processor is configured to execute the computer-readable instructions to determine the downlink correction parameter as a function of a step size, the step size being a function of the loading conditions and the modulation coding scheme.

In yet another example embodiment, the processor is configured to execute the computer-readable instructions to determine a target block error rate for the user equipment, determine the step size based on the target block error rate, and determine the downlink correction parameter based on the determined step size and a previous value of the downlink correction parameter.

In yet another example embodiment, the processor is configured to execute the computer-readable instructions to determine the target block error rate as a function of the modulation coding scheme, the modulation coding scheme being a modulation coding scheme previously assigned for downlink transmission of a previous data packet on the downlink channel.

In yet another example embodiment, the downlink channel is a physical downlink control channel (PDCCH), and the processor is configured to execute the computer-readable instructions to determine an aggregation level to be used on the PDCCH for the user equipment based on the determined target SINR and a plurality of thresholds.

In yet another example embodiment, the processor is configured to execute the computer-readable instructions to detect a channel quality indication value based on a probabilistic joint detection of channel quality indication values and rank values received from the user equipment, determine an estimate of a downlink SINR corresponding to the user equipment based on the detected channel quality indication value, determine whether at least one measurement has been received from the user equipment within a period of time from a time at which the channel quality indication value is detected, update the estimated downlink SINR based on the at least one measurement if the processor determines that the at least one measurement has been received within the period of time, and determine the target SINR based on the determined downlink correction parameter and at least one of the determined estimate of the downlink SINR or the updated estimate of the downlink SINR.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein:

FIG. 3A depicts an example of an UL_SINR to MCS mapping table for large PUSCH grants, according to an example embodiment;

FIG. 3B depicts an example of an UL_SINR to MCS mapping table for small PUSCH grants, according to an example embodiment;

FIG. 7A illustrates a target BLER as a linear function of the assigned UL MCS value, according to an example embodiment;

FIG. 8 illustrates an example of a CQI to DL_SINR mapping table, according to an example embodiment;

FIG. 9 depicts an example of a DL_SINR to DL MCS mapping table, according to an example embodiment;

FIG. 12B illustrates a target BLER as piecewise linear function of the assigned DL MCS value, according to an example embodiment;

FIG. 20 illustrates a table for updating the estimated DL_SINR based on RSRQ measurement, according to an example embodiment.

DETAILED DESCRIPTION OF EXAMPLE EMBODIMENTS

Figure 1:
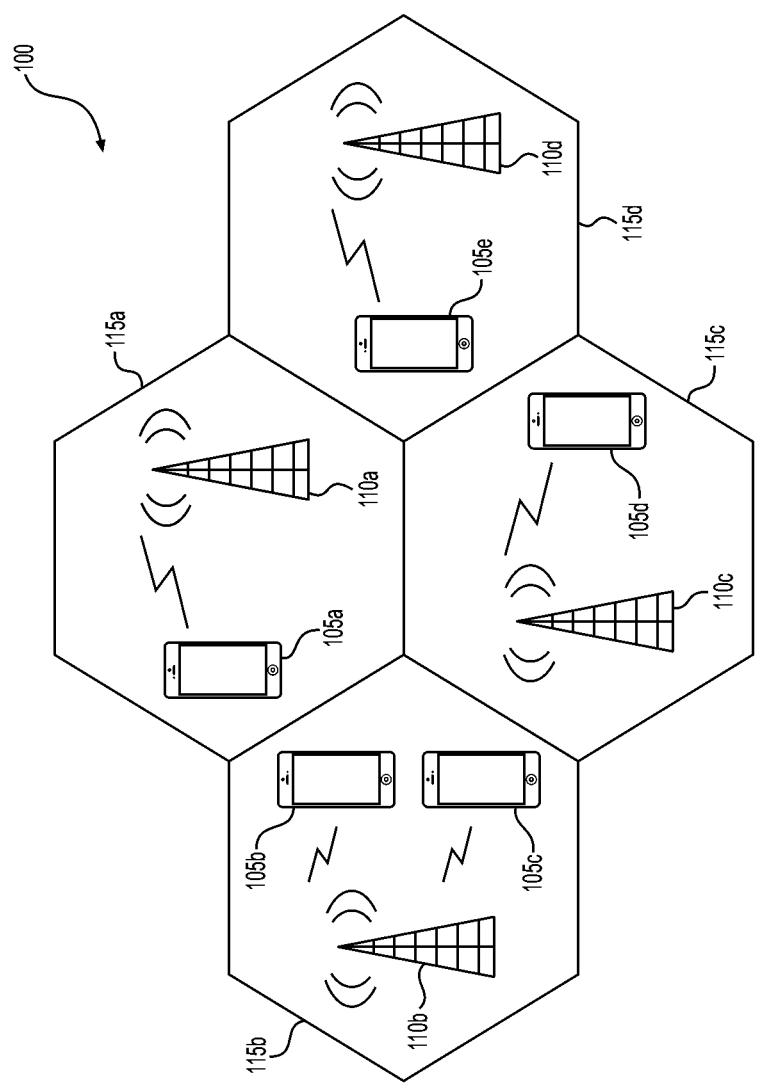
FIG. 1 illustrates a wireless communication system, according to an example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

FIG. 1 illustrates a wireless communication system, according to an example embodiment. As shown in FIG. 1, a communication system 100 includes one or more user equipment (UEs) 105a-e serviced by one or more base stations (BS) 110a-d. While the communication system 100 of FIG. 1 illustrates five UEs 105a-e and four BSs 110a-d, example embodiments are not limited thereto and the communication system 100 may include any number of UEs and any number of BSs. Each of the BSs 110a-d may serve ones of the UEs 105a-e within a certain geographical area serviced by each of the BSs 110a-d, which may be referred to as a cell, such as cells 115a-d shown in FIG. 1. The UEs 105a-e may move from one cell to another and thus may be served by any of the BSs 110a-d depending on the location of the UEs 105a-e. In one example embodiment, the communication system 100 is a Long Term Evolution (LTE) network and the BSs 110a-d are eNodeBs. While, example embodiments will be described hereinafter with reference to an LTE network, those having ordinary skill in the art realize that example embodiments are not limited to LTE communication systems only.

In one example embodiment, the UEs 105a-e may be any known, or to be developed, mobile/cellular phones but example embodiments are not limited thereto. For example, any one of the UEs 105a-e may instead be a tablet, a laptop or any other device (e.g., Internet of Things) capable of establishing communication with one or more of the eNodeBs 110a-d).

While the communication system 100 of FIG. 1 is shown with the UEs 105a-e and the eNodeBs 110a-d, the communication system 100 may have other components (e.g., a mobility management entity, a packet gateway, etc.) that are known to those having ordinary skill in the art and that are necessary for the proper operation of the communication system 100.

In example embodiments described below, reference will be made to eNodeB 110a and UE 105a. However, the same may be equally applied to any of the other eNodeBs 110b-d and UEs 105b-e.

Figure 2:
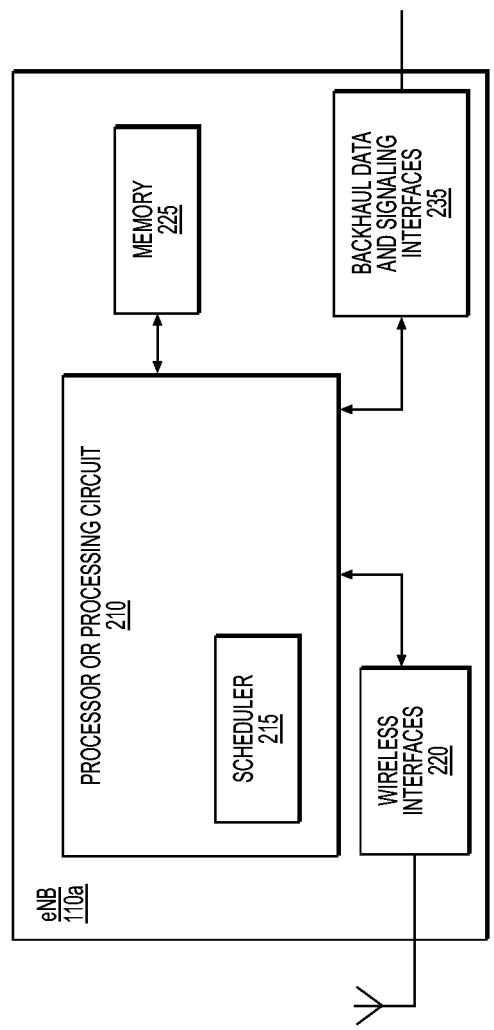
FIG. 2 illustrates an eNodeB of FIG. 1, according to an example embodiment.

FIG. 2 illustrates an eNodeB of FIG. 1, according to an example embodiment. Referring to FIG. 2, the eNodeB 110a includes: a memory 225; a processor 210; wireless communication interfaces 220; and a backhaul data and signaling interfaces (referred to herein as backhaul interface) 235. The processor or processing circuit 210 controls the function of eNodeB 110a (as described herein), and is operatively coupled to the memory 225 and the communication interfaces 220. While only one processor 210 is shown in FIG. 2, it should be understood that multiple processors may be included in a typical eNodeB, such as the eNodeB 110a. The functions performed by the processor may be implemented using hardware. As discussed above, such hardware may include one or more Central Processing Units (CPUs), digital signal processors (DSPs), application-specific-integrated-circuits, field programmable gate arrays (FPGAs) computers or the like. The term processor or processing circuit, used throughout this document, may refer to any of these example implementations, though the term is not limited to these examples. In one example embodiment, the processor 210 is configured to execute a set of computer-readable instructions stored on the memory 225, thus transforming the processor 210 into a special purpose processor for performing functionalities that will be described below. For example, as part of the functionalities implemented by this special purpose processor, the processor 210 may be configured to implement the functionalities of the scheduler 215 shown in FIG. 2.

Still referring to FIG. 2, the wireless communication interfaces 220 (also referred to as communication interfaces 220) include various interfaces including one or more transmitters/receivers (or transceivers) connected to one or more antennas to wirelessly transmit/receive control and data signals to/from the UE 105a, or via a control plane.

The backhaul interface 235 interfaces with other components of the wireless communication system 100 (not shown) such as, but not limited to, a packet gateway, a mobility management entity, other eNodeBs, Evolved Packet Core network elements and/or other radio access network elements within the communication system 100.

The memory 225 may buffer and store data that is being processed at eNodeB 110a, transmitted and received to and from the eNodeB 110a. The memory 225 may also store the computer-readable instructions to be executed by the processor 210 for performing the following functionalities, as described above.

Still referring to FIG. 2, by implementing the functionalities of the scheduler 215, the processor 210 schedules control and data communications that are to be transmitted and received by the eNodeB 110a to and from UE 105a.

As described above in the Background Section, currently data rate assignment for uplink (UL) and downlink (DL) data transmission are independent of the network load and/or the assigned modulation coding scheme (MCS). Hereinafter, example embodiments will be described for a dynamic adaptation of the UL and DL data rate assignment. The dynamic data rate assignments for the UL and the DL will be described separately.

Dynamic Data Rate Assignment for Uplink Data Transmission

In one example embodiment and in order to determine the appropriate modulation coding scheme (MCS) for the UE 105a to transmit data on an UL channel, the eNodeB 110a operates as described below.

The eNodeB 110a determines (calculates) a target signal to interference and noise ratio (SINR) for the UE 105a according to known methods. Based on parameters broadcast by the eNodeB 110a (e.g., a nominal physical uplink shared channel (PUSCH) power) and a pathloss (PL) measurement, the UE 105a determines a transmit power for UL transmission by the UE 105a.

Upon receiving a Sounding Reference Signal (SRS) on the UL channel from the UE 105a, the eNodeB 110a measures a SRS SINR, according to known methods. The SRS SINR is then used as an estimate of the UL_SINR. Based on a power headroom report, the SRS SINR is corrected to obtain an adjusted (normalized) SRS SINR, denoted as UL_SINR.

After each data packet transmission on the UL channel from the UE 105a to the eNodeB 110a, the UL_SINR is adjusted/updated based on a spectral efficiency correction, which may also be referred to as link adaptation. In one example embodiment, the adjusting/updating of the UL_SINR is given by $$\text{Updated UL\_SINR} = \text{Previous UL\_SINR} + \text{Spectral Efficiency Correction} \quad (1)$$

At each transmission time interval (TTI) at which an UL packet is transmitted from the UE 105a to the eNodeB 110a, the eNodeB 110a selects an UL MCS based on the Updated UL-SINR. In one example embodiment, the eNodeB 110a selects the UL MCS using a mapping table such as that shown in FIGS. 3A and 3B. FIG. 3A depicts an example of an UL_SINR to MCS mapping table for large PUSCH grants, according to an example embodiment. FIG. 3B depicts an example of an UL_SINR to MCS mapping table for small PUSCH grants, according to an example embodiment. In one example embodiment, large PUSCH grants are grants equal to or larger than a value of the physical resource block (PRB) size threshold (e.g., a default value of 7) parameter, while small PUSCH grants are grants less than the value of the PRB size threshold.

Currently and as discussed in the Background Section, the eNodeB 110a performs a static determination of the Spectral Efficiency Correction parameter of equation (1) (hereinafter also referred to as the UL correction parameter), denoted as SE_Corr (i.e., a static determination that is independent of the network loading conditions experienced by the eNodeB 110a and/or the assigned MCS for UL transmission by the UE 105a).

Example embodiments described hereinafter, enable a dynamic determination of the SE_Corr parameter for the UE 105a served by the eNodeB 110a at each TTI, based on network loading conditions and/or the assigned MCS for UL transmission by the UE 105a. The determined SE_Corr at each TTI is then used in equation (1) to update the UL-SINR and subsequently modify the MCS (e.g., using the UL_SINR to UL MCS tables shown in FIGS. 3A and 3B).

Figure 4:
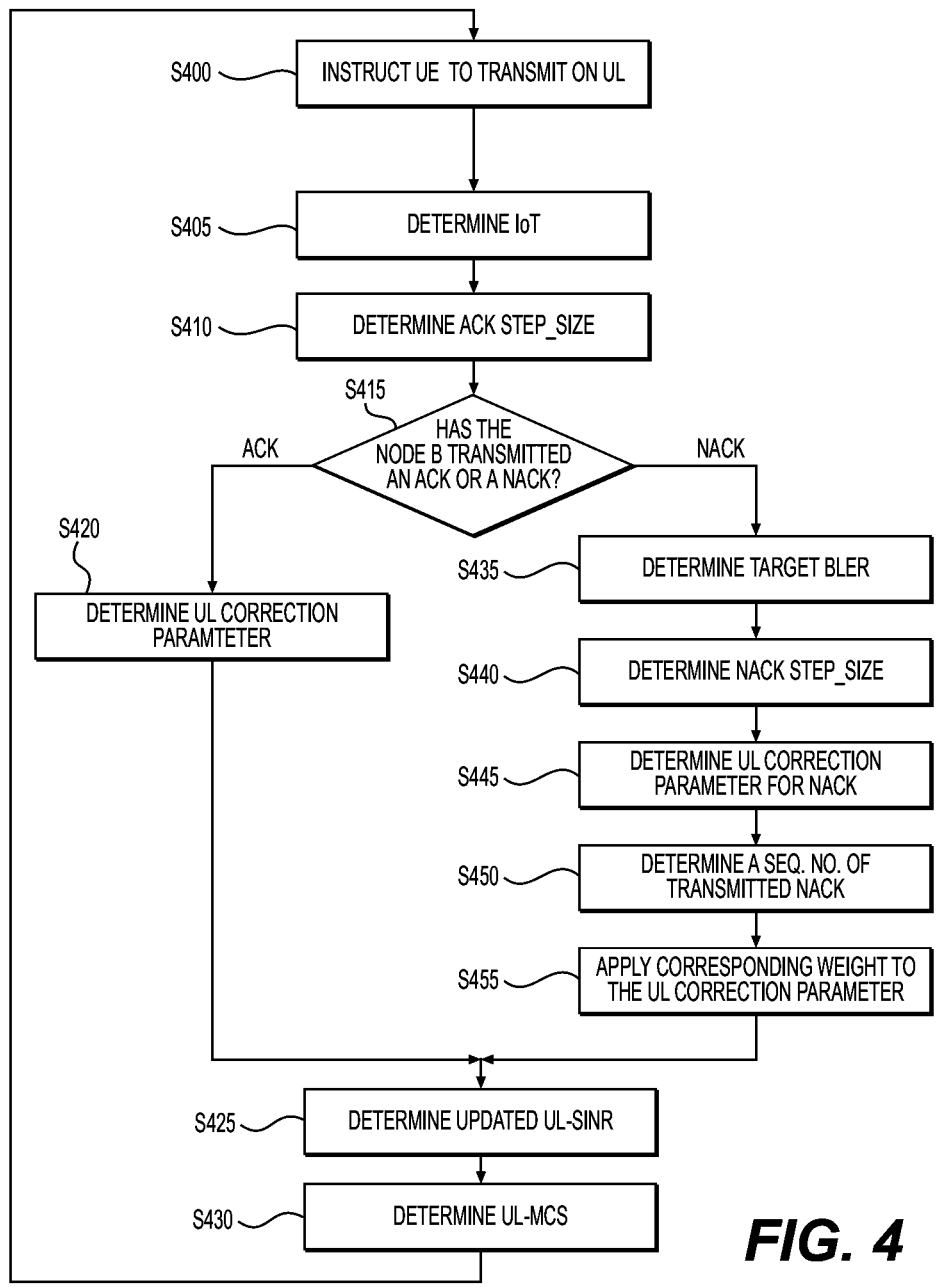
FIG. 4 describes a process for a dynamic determination of a spectral efficiency correction parameter (UL correction parameter) to be utilized in determining a modulation coding scheme for uplink transmission by a UE to a serving eNodeB of FIG. 1, according to one example embodiment.

FIG. 4 describes a process for a dynamic determination of a spectral efficiency correction parameter (UL correction parameter) to be utilized in determining a modulation coding scheme for uplink transmission by a UE to a serving eNodeB of FIG. 1, according to one example embodiment. While FIG. 4 is described below with reference to the eNodeB 110a, it will be understood that it is the processor 210 of the eNodeB 110a, through execution of computer readable instructions stored on the memory 225 that performs the underlying functions.

As S400, the eNodeB 110a instructs the UE 105a to send a data packet on an uplink channel in a particular transmission time interval (TTI). In one example embodiment, the UL channel on which the data packet is transmitted is a PUSCH.

At S405, the eNodeB 110a determines an Interference to Thermal Noise (IoT) value for the eNodeB 110a. In one example embodiment, the IoT is measured according to any known, or to be developed, method and represented in decibel (dB) units. In one example embodiment, the IoT is a per-cell carrier dependent value of the eNodeB 110a. In one example embodiment, the IoT is a parameter indicative of a network loading condition as seen by the eNodeB 110a (hereinafter referred to as a loading parameter or a loading condition).

Figure 5:
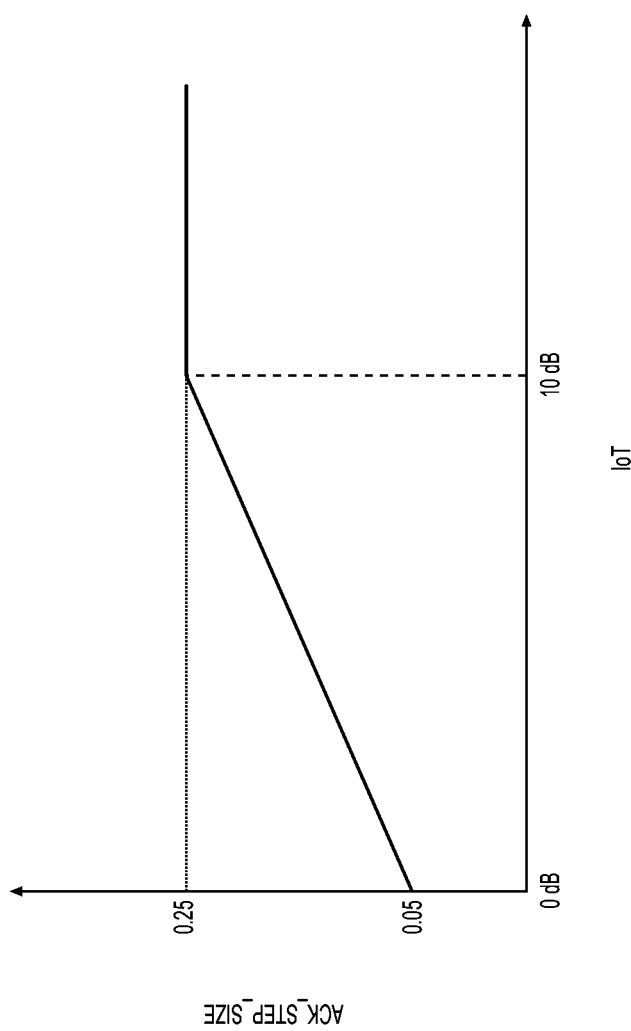
FIG. 5 illustrates a graph for determining an ACK_step_size, according to an example embodiment.

Upon determining the IoT at S405, at S410, the eNodeB 110a determines ACK_step_size for the UE 105a from which the data packet is received. FIG. 5 illustrates a graph for determining an ACK_ste_size, according to an example embodiment.

As can be seen from FIG. 5, depending on the value of the IoT determined at S405, the ACK_step_size may either be a linear function of the IoT value or be a constant. For example, if the IoT, as determined at S405, has a value between 0 dB to 10 dB, then the ACK_step_size is determined as:

$$\text{ACK\_step\_size}=[0.05+(\text{IoT}/10)*0.2] \text{ for } 0<\text{IoT}<10 \text{ dB} \quad (2)$$

Moreover, if the IoT as determined at S405 has a value greater than 10 dB, then the ACK_step_size is determined to be 0.25, as shown in FIG. 5.

It should be noted that the example graph of FIG. 5 and the example threshold of 10 dB for purposes of determining the ACK_step_size are non-limiting and that example embodiments are not limited to the specific graph of FIG. 5 and/or the example threshold of 10 dB. For example, the ACK_step_size may be a piecewise linear function of the IoT value, a non-linear function of the IoT value, etc.

In yet another example embodiment, the eNodeB 110a determines the ACK_step_size as a function of a number of active UEs serviced by the eNodeB 110a (e.g., a specific cell of the eNodeB 110a). Therefore, the number of active UEs is another example of a loading parameter/condition described above.

Figure 6:
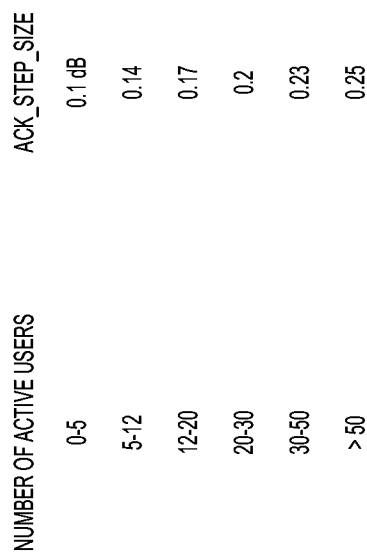
FIG. 6 illustrates an example look up table for determining an ACK_step_size as a function of a number of active UEs, according to an example embodiment.

For example, the eNodeB 110a may have a look up table (LUT) with various ACK_step_sizes for various ranges of number of active UEs serviced by the eNodeB 110a. FIG. 6 illustrates an example look up table for determining an ACK_step_size as a function of a number of active UEs, according to an example embodiment. In one example embodiment, the eNodeB 110a determines the number of active UEs according to any known, or to be developed method for identifying active UEs serviced by an eNodeB. As shown in FIG. 6 and in one example embodiment, if the eNodeB 110a determines that the number of active UEs serviced by the eNodeB 110a is between 5-12 then the ACK_step_size is determined to be equal to 0.14.

It should be noted that the example look up table shown in FIG. 6 is non-limiting and that example embodiments are not limited to the specific look up table shown in FIG. 6. Instead, any look up table with other ranges and step sizes as determined during experiments and empirical studies may be utilized.

In one example embodiment and for purposes of determining the ACK_step_size, the eNodeB 110a may create a two-dimensional matrix for various ACK_step_sizes as a function of both the number of active users and various IoT values and then determines the ACK_step_size using such a two-dimensional matrix.

Referring back to FIG. 4 and upon determining the ACK_step_size at S410, at S415, the eNodeB 110a determines whether the eNodeB 110a transmitted an acknowledge (ACK) message/feedback or a negative acknowledgement (NACK) message/feedback to the UE 105a from which the eNodeB 110a received the data packet on the UL channel.

If at S415, the eNodeB 110a determines that an ACK message has been transmitted to the UE 105a in response to the received data packet on the UL channel, then at S420 the eNodeB 110a determines the SE_Corr (UL correction parameter) during the TTI (i), where i is an integer equal to or greater than 1, as follows.

$$\text{SE\_Corr}(i)=\text{SE\_Corr}(i-1)+\text{ACK\_step\_size} \quad (3)$$

where SE_Corr (i−1) is the SE_Corr determined by the eNodeB 110a for the previous TTI and the ACK-step-size is the ACK_step_size determined at S410 described above.

Thereafter, at S425 and using equation (1) described above, the eNodeB 110a determines the updated UL_SINR using the SE-Corr(i) determined at S420 and a previously determined UL_SINR value.

Using the updated UL_SINR value determined at S425, at S430, the eNodeB 110a determines (adjusts) the UL MCS to be used for UL transmission by the UE 105a using, for example, the tables shown in FIGS. 3A and 3B, discussed above. After S430, the process reverts back to S400.

Figure 7B:
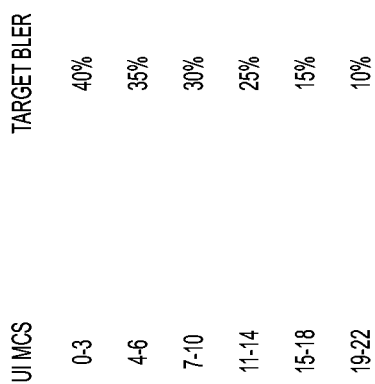
FIG. 7B illustrates a target BLER as piecewise linear function of the assigned UL MCS value, according to an example embodiment.

Returning to S415, if the eNodeB 110a determines that a NACK message has been transmitted in response to the data packet received on the UL channel from the UE 105a, then at S435, the eNodeB 110a determines a target block error rate (BLER), denoted as t_BLER. In one example embodiment, the eNodeB 110a determines the t_BLER as a function of the UL MCS (e.g., the UL MCS that was assigned to the UE 105a during a previous UL transmission by the UE 105a). In one example embodiment, the t_BLER is a linear function of the assigned UL MCS. In another example embodiment, the t_BLER is a piecewise linear function of the assigned UL MCS. FIG. 7A illustrates a target BLER as a linear function of the assigned UL MCS value, according to an example embodiment. FIG. 7B illustrates a target BLER as piecewise linear function of the assigned UL MCS value, according to an example embodiment. The piecewise linear relationship between the t_BLER and the assigned UL MCS is illustrated in FIG. 7B in the form of a look up table.

It should be noted that FIGS. 7A and 7B provide merely example relationships between the t_BLER and the UL MCS but example embodiments are not limited thereto.

At S440 and upon determining the t_BLER, the eNodeB 110a determines the NACK_step_size. In one example embodiment, the eNodeB 110a determines the NACK_step_size as a function of the t_BLER and the ACK_step_size determined at S410. Determining the NACK_step_size as a function of the t_BLER and the ACK_step_size may be performed according to the following formula:

$$NACK\_step\_size = ACK\_step\_size * ((1 - t\_BLER)/t\_BLER) \quad (4)$$

Thereafter, at S445, the eNodeB 110a determines the SE_Corr value (UL correction parameter) for the NACK message by using the determined NACK_step_size in equation (3) instead of the ACK_step_size used in equation (3) at S420 for the case where the ACK message was sent by the eNodeB 110a to the UE 105a. In one example embodiment, if the ACK message has a positive value, the NACK message will have a negative value.

Thereafter, at S450, the eNodeB 110a determines a sequence number of the transmitted NACK message that has been transmitted by the eNodeB 110a to the UE 105a in response to the data packet received from the UE 105a on the UL channel. The sequence number refers to the order of the NACK message (e.g., the number of NACK message) in a sequence of NACK messages transmitted by the eNodeB 110a to the UE 105a (e.g., first NACK message, second NACK message, third NACK message, etc.).

Depending on the sequence number of the NACK message determined at S450, at S455, the eNodeB 110a applies a corresponding weight to the SE-Corr value (UL correction parameter) determined at S440 (i.e., the eNodeB 110a scales the SE-Corr value determined at S440). For example, for the first NACK message sent, the weight applied to SE-Corr determined at S440 is 1. For the second and third NACK messages sent, the weight applied to SE-Corr determined at S440 is 1.25. For the fourth and fifth NACK messages sent as well as for full data packet failure, the weight applied to SE-Corr determined at S440 is 1.5.

It should be noted that the weights applied and discussed above are merely examples and that example embodiments are not limited thereto. The weights may be determined based on empirical studies and may take on any other appropriate value.

Thereafter, the process reverts back to S425 and the eNodeB 110a repeats S425 and S430.

In one example embodiment, the steps S445 and S450 are optional and thus may not be implemented by the eNodeB 110a. Furthermore and in other example embodiments, the order of the steps described with reference to FIG. 4 may be altered. For example, the steps of S405 and S410 may be performed after S415.

Furthermore, while specific functions/look up tables/relationships for determining ACK_step_sizes, NACK_step_sizes, etc., have been described above with reference to FIGS. 4-7A-B, said functions/look up tables/relationships are merely examples and are non-limiting. Other known, or to be developed, functions/look up tables/relationships, etc., may be used in performing the functions described above with reference to FIG. 4.

FIGS. 2-7A-B have been described for dynamic/adaptive (load and MCS dependent) rate assignment for UL transmissions from any of the UEs 105a-e to a serving one of the eNodeBs 110a-d of FIG. 1. Hereinafter, dynamic/adaptive rate assignment for DL transmission from a serving eNodeB 110a to a receiving UE 105a will be described.

Dynamic Data Rate Assignment for Downlink Data Transmission

In one example embodiment and in order to determine the appropriate modulation coding scheme (MCS) for data transmission to the UE 105a on a DL channel, the eNodeB 110a operates as described below.

In one example embodiment, the UE 105a transmits periodic or aperiodic feedback of the channel's radio frequency (RF) conditions such as channel quality indication (CQI), pre-coding matrix indication (PMI), and the rank indicator (RI). Based on the received feedback, eNodeB 110a's scheduler decides to transmit in one of well-known Rank 1 mode or Rank 2 mode. Further, based on a filtered average of the CQIs, the eNodeB 110a obtains an estimate of the DL_SINR using a CQI to DL_SINR mapping table. FIG. 8 illustrates an example of a CQI to DL_SINR mapping table, according to an example embodiment. Using the mapping table, the eNodeB 110a estimates the DL_SINR of the UE 105a to which a data packet has been transmitted. Thereafter, the eNodeB 110a further refines/adjusts the DL_SINR, similar to the UL case described above, using the ACK/NACK message/feedback received from the UE 105a.

After each data packet transmission on a DL channel to the UE 105a, by the eNodeB 110a, the DL_SINR is adjusted/updated based on a DL_BLER loop correction parameter, denoted as DL_BLER_Loop_Correction. In one example embodiment, the DL_SINR is adjusted/updated according to the following formula $$Updated\ DL\_SINR = Estimated\ DL\_SINR + DL\_BLER\_Loop\_Correction \quad (5)$$

At each transmission time interval (TTI) at which a data packet is transmitted on the DL to the UE 105a, the eNodeB 110a selects a DL MCS based on the updated DL_SINR. In one example embodiment, the eNodeB 110a selects the DL MCS using a mapping table such as that shown in FIG. 9. FIG. 9 depicts an example of a DL_SINR to DL MCS mapping table, according to an example embodiment.

Currently and as discussed in the Background Section, the eNodeB 110a performs a static determination of the DL_BLER_Loop_Correction parameter of equation (5) (hereinafter also referred to as the DL correction parameter) (i.e., a static determination that is independent of the network loading conditions experienced by the eNodeB 110*a* and/or the assigned MCS for DL transmission by the eNodeB 110*a*).

Example embodiments described hereinafter, enable a dynamic/adaptive determination of the DL_BLER_Loop_Correction value for each UE 105*a* served by a serving eNodeB 110*a* at each TTI, based on network loading conditions and/or the assigned MCS for DL transmission by the eNodeB 110*a*. The determined DL_BLER_Loop_Correction at each TTI is then used in equation (1) to update the DL_SINR and subsequently modify the DL MCS (e.g., using the DL_SINR to DL MCS table shown in FIG. 9).

Figure 10:
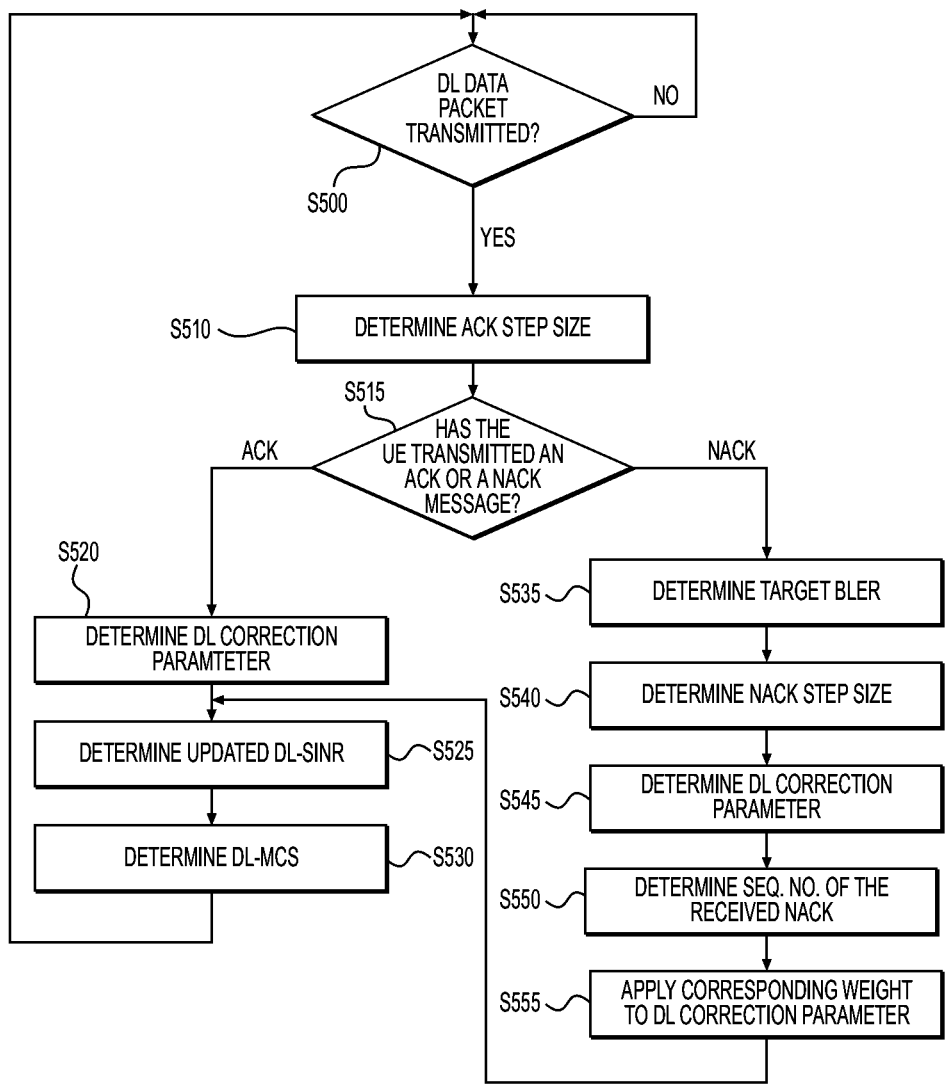
FIG. 10 describes a process for a dynamic determination of a block error rate correction parameter to be utilized in determining a modulation coding scheme for downlink transmission by a serving eNodeB to a UE of FIG. 1, according to one example embodiment.

FIG. 10 describes a process for a dynamic determination of a block error rate correction parameter to be utilized in determining a modulation coding scheme for downlink transmission by a serving eNodeB to a UE of FIG. 1, according to one example embodiment. While FIG. 10 is described below with reference to the eNodeB 110*a*, it will be understood that it is the processor 210 of the eNodeB 110*a*, through execution of computer readable instructions stored on the memory 225 that performs the underlying functions.

As S500, the eNodeB 110*a* determines whether a data packet has been transmitted on a DL channel to the UE 105*a*. In one example embodiment, the DL channel on which the data packet is transmitted is a Physical Downlink Control Channel (PDCCH). If at S500, the eNodeB 110*a* determines that a data packet has not been transmitted on a DL channel to the UE 105*a*, the eNodeB 110*a* waits for a desired (and/or alternatively, a predetermined period of time) in order to check for any transmitted data packets on the DL channel and then repeats S500. Alternatively and instead of checking for possible data packets once every desired period of time, the eNodeB 110*a* waits for as long as it takes until a data packet is transmitted on the DL channel to the UE 105*a* by the eNodeB 110*a*. Thereafter, for each of the UEs 105*a* to which a data packet has been transmitted on the DL channel, the serving eNodeB 110*a* performs the following.

Once the eNodeB 110*a* determines that a data packet has been transmitted on the DL channel to the UE 105*a*, then at S510 the eNodeB 110*a* determines the ACK_step_size as function of a number of users (e.g., a function of a number of active UEs) served by the eNodeB 110*a*, which is an example of a loading parameter/condition described above. In one example embodiment, the eNodeB 110*a* determines the ACK_step_size as any one of a linear function, a non-linear function or a piecewise linear function of the number of active UEs served by the eNodeB 110*a*.

Figure 11:
FIG. 11 illustrates an example look up table for determining an ACK_step_size as a function of a number of active UEs, according to an example embodiment.

For example, the eNodeB 110*a* may have a look up table (LUT) with ACK_step_sizes for various ranges of the number of active UEs serviced by the eNodeB 110*a* (e.g., serviced by a specific cell of the eNodeB 110*a*). FIG. 11 illustrates an example look up table for determining an ACK_step_size as a function of a number of active UEs, according to an example embodiment. In one example embodiment, the eNodeB 110*a* determines the number of active UEs according to any known, or to be developed method for identifying the active UEs serviced by an eNodeB 110*a*. As shown in FIG. 11 and in one example embodiment, if the eNodeB 110*a* determines that the number of active UEs serviced by the eNodeB 110*a* is between 0-15, then the ACK_step_size is determined to be equal to 0.2

It should be noted that the example look up table shown in FIG. 11 is non-limiting and that example embodiments may utilize any appropriate look up table with other ranges and step sizes as determined based on experiments and empirical studies.

In yet another example embodiment, at S510, the eNodeB 110*a* first determines an Interference to Thermal Noise (IoT) value for the eNodeB 110*a*, in a similar manner as described above with reference to the UL case. Second and based on the IoT value, the eNodeB 110*a* determines the ACK_step_size at S510. In one example embodiment, the eNodeB 110*a* determines the ACK_step_size based on the IoT (where IoT has a per cell-carrier dependent value) in a similar manner as described above with reference to the UL case using the graph of FIG. 5.

In one example embodiment and for purposes of determining the ACK_step_size, the eNodeB 110*a* may create a two-dimensional matrix for various ACK_step_sizes as a function of both the number of active users and various IoT values and then determines the ACK_step_size using such two-dimensional matrix.

Referring back to FIG. 10 and upon determining the ACK_step_size at S510, at S515, the eNodeB 110*a* determines whether the UE 105*a* transmitted an ACK message/feedback or a NACK message/feedback to the eNodeB 110*a* in response to receiving the data packet on the DL channel from the eNodeB 110*a*.

If at S515, the eNodeB 110*a* determines that an ACK message/feedback has been received from the UE 105*a* in response to the transmitted data packet on the DL channel, then at S520 the eNodeB 110*a* determines the DL_BLER_Loop_Correction (DL correction parameter) during the TTI (i), where i is an integer equal to or greater than 1, as follows.

$$DL\_BLER\_Loop\_Correction(i)=DL\_BLER\_Loop\_Correction(i-1)+ACK\_step\_size \quad (6)$$

where DL_BLER_Loop_Correction(i−1) is the DL_BLER_Loop_Correction determined by the eNodeB 110*a* for the previous TTI and the ACK-step-size is the ACK_step_size determined at S510 described above.

Thereafter, at S525 and using equation (5) described above, the eNodeB 110*a* determines the updated DL_SINR using the DL_BLER_Loop_Correction determined at S420 and an Estimated DL_SINR value (e.g., the DL_SINR value estimated using the CQI parameter discussed above).

Using the updated DL_SINR value determined at S525, at S530, the eNodeB 110*a* determines (adjusts) the DL MCS to be used for DL transmission to the UE 105*a* using, for example, the tables shown in FIG. 9, discussed above. After S530, the process reverts back to S500.

Figure 12A:
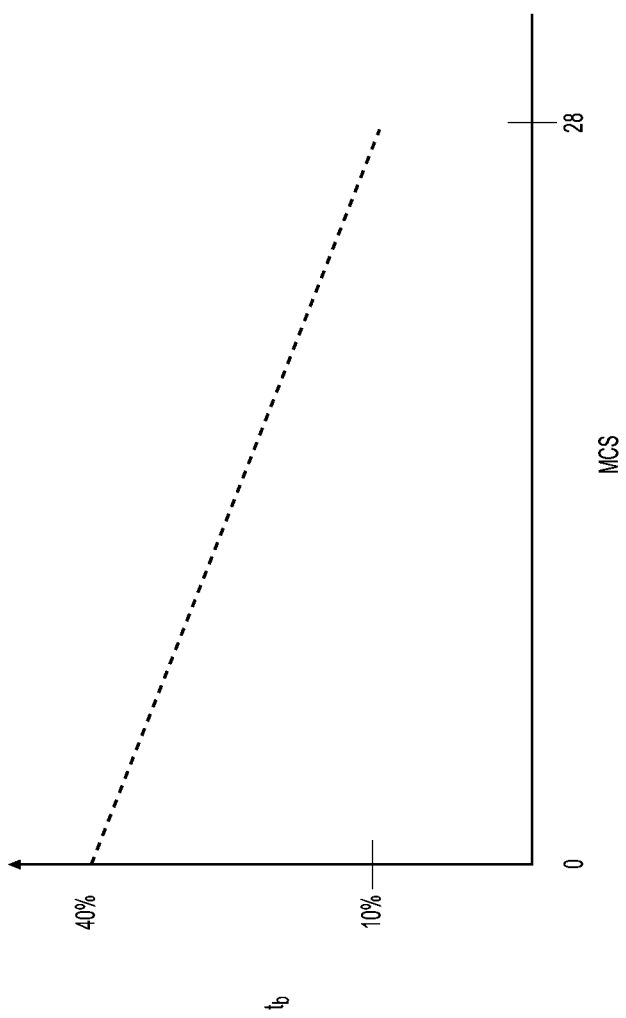
FIG. 12A illustrates a target BLER as a linear function of the assigned DL MCS value, according to an example embodiment.

Returning to S515, if the eNodeB 110*a* determines that a NACK message/feedback has been received from the UE 105*a* in response to the data packet transmitted on the DL channel, then at S535, the eNodeB 110*a* determines a target block error rate (BLER), denoted as t_BLER. In one example embodiment, the eNodeB 110*a* determines the t_BLER as a function the DL MCS (e.g., the DL MCS that was assigned for a previous DL transmission by the eNodeB 110*a*). In one example embodiment, the t_BLER is a linear function of the assigned DL MCS. In another example embodiment, the t_BLER is a piecewise linear function of the assigned DL MCS. FIG. 12A illustrates a target BLER as a linear function of the assigned DL MCS value, according to an example embodiment. FIG. 12B illustrates a target BLER as piecewise linear function of the assigned DL MCS value, according to an example embodiment. The piecewise linear relationship between the t_BLER and the assigned DL MCS is illustrated in FIG. 12B in the form of a look up table.

It should be noted that FIGS. 12A and 12B provide merely example relationships between the t_BLER and the DL MCS but example embodiments are not limited thereto.

At S540 and upon determining the t_BLER, the eNodeB 110*a* determines the NACK_step_size. In one example embodiment, the eNodeB 110*a* determines the NACK_step_size as a function of the t_BLER and the ACK_step_size determined at S510. Determining the NACK_step_size as a function of the t_BLER and the ACK_step_size may be performed according to the following formula:

$$\text{NACK\_step\_size} = \text{ACK\_step\_size} * ((1 - t\_\text{BLER})/t\_\text{BLER}) \quad (7)$$

Thereafter, at S545, the eNodeB 110*a* determines the DL_BLER_Loop_Correction value (DL Correction Parameter) for the NACK message by using the determined NACK_step_size in equation (6) instead of the ACK_step_size used in equation (6) at S520 for the case where the ACK message was received by the eNodeB 110*a* from the UE 105*a*.

Thereafter, at S550, the eNodeB 110*a* determines a sequence number of the received NACK message that has been received by the eNodeB 110*a* from the UE 105*a* in response to the data packet transmitted to the UE 105*a* on the DL channel. The sequence number refers to the order of the NACK message in a sequence of NACK messages received by the eNodeB 110*a* from the UE 105*a* (e.g., first NACK message, second NACK message, third NACK message, etc.).

Depending on the sequence number of the NACK message determined at S550, at S555, the eNodeB 110*a* applies a corresponding weight to the DL_BLER_Loop_Correction value determined at S540 (i.e., the eNodeB 110*a* scales the DL_BLER_Loop_Correction value determined at S540). For example, for the first NACK message received, the weight applied to DL_BLER_Loop_Correction determined at S540 is 1. For the second and third NACK messages received, the weight applied to DL_BLER_Loop_Correction determined at S540 is 1.25. For the fourth and fifth NACK messages received as well as for full data packet failure, the weight applied to DL_BLER_Loop_Correction determined at S540 is 1.5.

It should be noted that the weights applied and discussed above are merely examples and that example embodiments are not limited thereto. The weights may be determined based on empirical studies and may take on any other appropriate value.

Thereafter, the process reverts back to S525 and the eNodeB 110*a* repeats S525 and S530.

In one example embodiment, the steps S545 and S550 are optional and thus may not be implemented by the eNodeB 110*a*. Furthermore and in other example embodiments, the order of the steps described with reference to FIG. 10 may be altered. For example, the step S510 may be performed after S515.

Furthermore, while specific functions/look up tables/relationships for determining ACK_step_sizes, NACK_step_sizes, etc., have been described above with reference to FIGS. 10-12A-B, said functions/look up tables/relationships are merely examples and are non-limiting. Other known, or to be developed, functions/look up tables/relationships, etc., may be used in performing the functions described with reference to FIG. 10.

The dynamic/adaptive changing of the ACK/NACK step sizes and the target BLER for both UL and DL cases and ultimately the corresponding UL and DL correction parameters, as described above, may impact the number of hybrid automatic repeat (HARQ) re-transmissions on the DL channel (e.g., the PDCCH) from one data packet to another.

Figure 13:
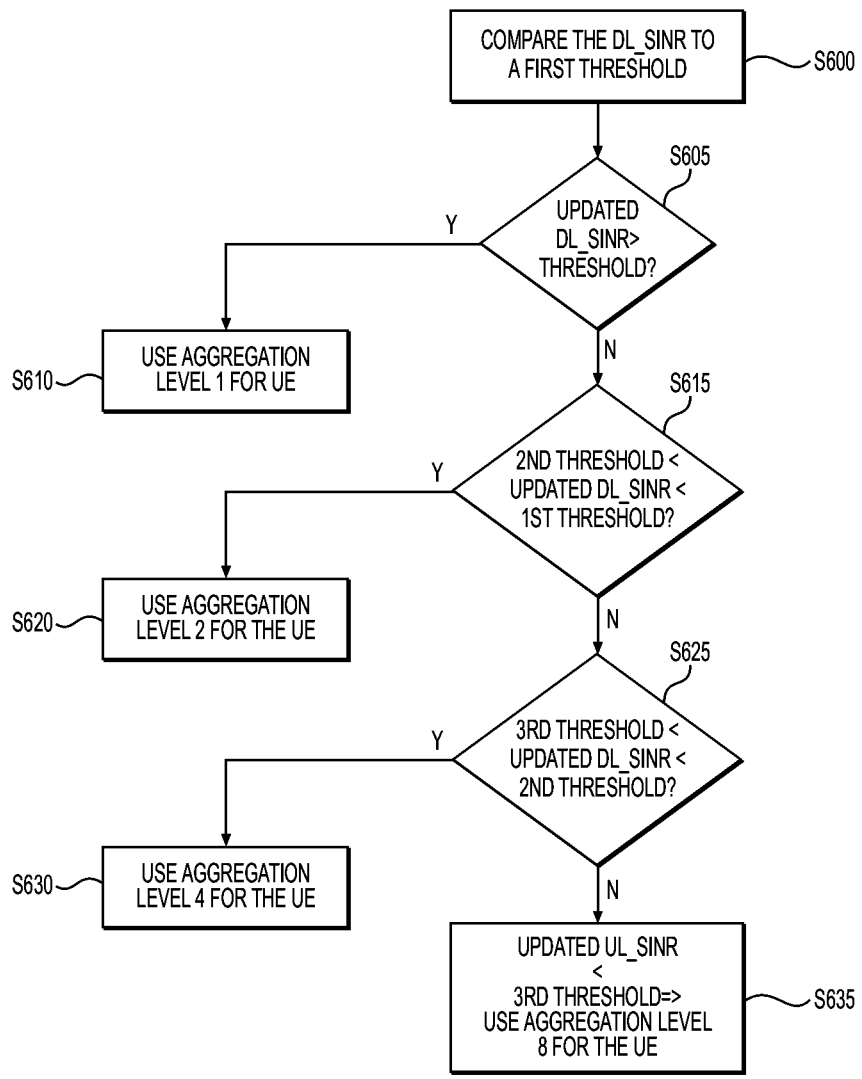
FIG. 13 describes a process for improving the reliability of HARQ transmission on a downlink channel, according to one example embodiment.

Accordingly, in one example embodiment and in order to improve the reliability of the HARQ transmission process, the following process described with reference to FIG. 13 is performed.

FIG. 13 describes a process for improving the reliability of HARQ transmission on a downlink channel, according to one example embodiment. At S600, the eNodeB 110*a* compares the updated DL_SINR, determined as described above, to a first threshold (e.g., 8.5 dB). At S605, the eNodeB 110*a* determines whether the updated DL_SINR is greater than the first threshold.

If at S605, the eNodeB 110*a* determines that the updated DL_SINR is greater than the first threshold, then at 8610, the eNodeB 110*a* uses aggregation level (AGL) 1 for the UE 105*a* on the PDCCH. In one example embodiment, an AGL determines the coding rate for the physical downlink control channel (PDCCH). The PDCCH is the channel over which the signaling information for the UL and the DL is sent from the eNodeB 110*a* to the UE 105*a*. In one example embodiment, the better the DL SINR, the less coding is needed for the PDCCH. An AGL 8 provides the most robust/reliable coding for the PDCCH, with the most amount of coding, while an AGL 1 provides the least robust/reliable coding for the PDCCH, with the least amount of coding.

However, if at S605, the eNodeB 110*a* determines that the updated DL_SINR is less than the first threshold, then at S615, the eNodeB 110*a* determines whether the updated DL_SINR is less than the first threshold but greater than a second threshold (e.g., 5 dB).

If at S615, the eNodeB 110*a* determines that the updated DL_SINR is less than the first threshold but greater than the second threshold, then at S620, the eNodeB 110*a* uses the AGL 2 for the UE 105*a* on the PDCCH.

However, if at S615, the eNodeB 110*a* determines that the updated DL_SINR is less than the second threshold, then at S625, the eNodeB 110*a* determines whether the updated DL_SINR is less than the second threshold but greater than a third threshold (e.g., −0.75 dB).

If at S625, the eNodeB 110*a* determines that the updated DL_SINR is less than the second threshold but greater than the third threshold, then at S630, the eNodeB 110*a* uses the AGL 4 for the UE 105*a* on the PDCCH.

However, if at S625, the eNodeB 110*a* determines that the updated DL_SINR is less than the third threshold, then at S635, the eNodeB 110*a* uses the AGL 8 for the UE 105*a* on the PDCCH.

It should be noted that the thresholds (the first threshold, second threshold and third threshold) described above with reference to FIG. 13 are merely examples. However, the example embodiments are not limited thereto and the thresholds may take on any other value, as deemed appropriate based on experiments and empirical studies.

As noted above, the DL_SINR is estimated using the CQI value as provided by the UE 105*a*. Currently, the DL_SINR is determined based on the last reported CQI value and/or an average of the last few (e.g., the last five) reported CQIs.

In one example embodiment and for a more accurate determination of the DL_SINR, the eNodeB 110*a* jointly detects the reported CQI and rank and determines a probability of each of the values. Example embodiments for joint detection of the correct CQI and rank values will be described with reference to FIGS. 14-19.

Figure 14:
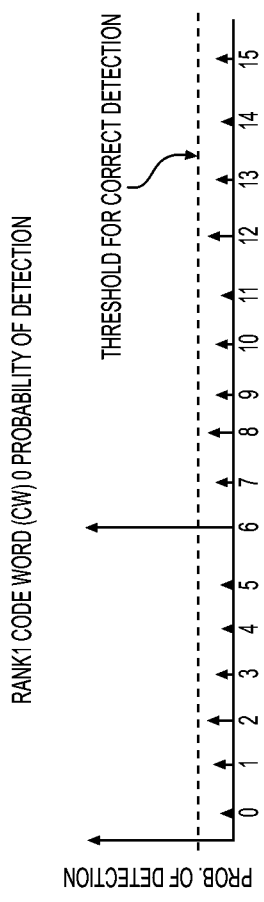
FIGS. 14-16 illustrates an example of a join detection of rank and CQI values reported by a UE, according to an example embodiment.
Figure 15:
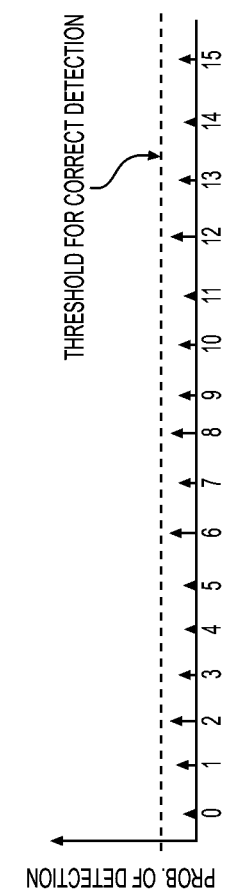
Figure 16:
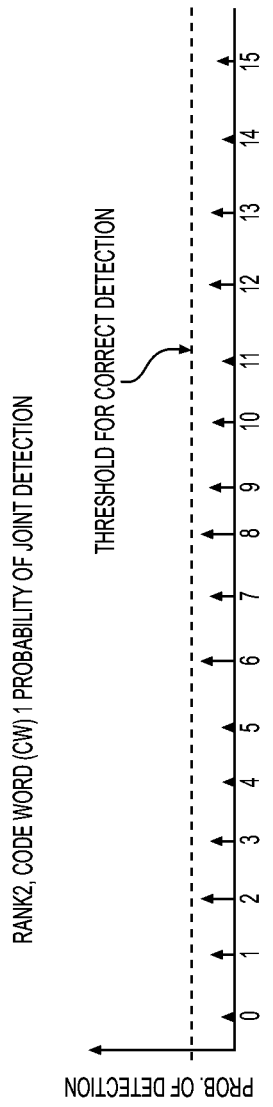

FIGS. 14-16 illustrate an example of a join detection of rank and CQI values reported by a UE, according to an example embodiment. FIG. 14 illustrates an example of a Rank 1 Code Word (CW) 0 probability of detection for each CQI (i.e., CQI ranging from 0 to 15). FIG. 15 illustrates an example of a Rank 2 CW 0 probability of detection for each CQI. FIG. 16 illustrates an example of a Rank 2 CW 1 probability of detection for each CQI.

Based on the probabilities of detection shown in FIGS. 14-16, the eNodeB 110a has 48 possible detection options available (16×3). A CQI that is above a threshold (i.e., the thresholds shown in FIGS. 14-16) is declared to be valid. In the example embodiment shown in FIGS. 14-16, the valid transmission would be Rank 1 CQI=6.

Figure 17:
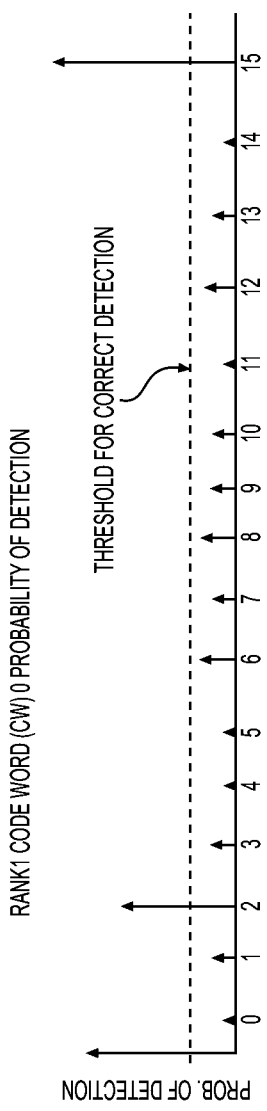
FIGS. 17-19 illustrate an example of a join detection of rank and CQI values reported by a UE, according to an example embodiment.
Figure 18:
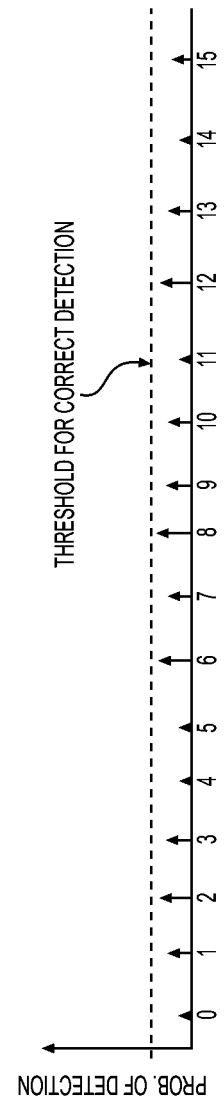
Figure 19:
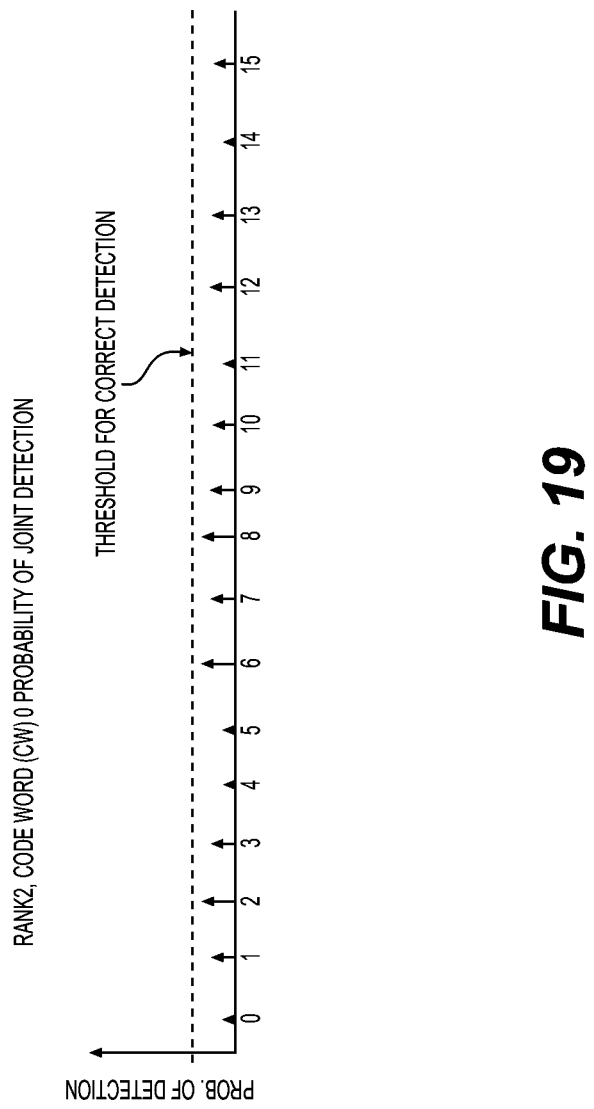

FIGS. 17-19 illustrate an example of a join detection of rank and CQI values reported by a UE, according to an example embodiment. In FIGS. 17-19, compared to FIGS. 14-16 described above, two possible CQIs are above the threshold, namely, Rank1 CQI=2 and Rank1 CQI=15. IN this case, the eNodeB 110a is to declare an erasure and not detect any rank or CQI values.

In order to further improve the reliability of the estimated DL_SINR based on the CQI value, in one example embodiment, the eNodeB 110a performs the following.

In a time interval less than a T_decay_timer (which may be determined based on empirical studies) before the eNodeB 110a uses the estimated DL_SINR to determine the updated DL_SINR, if the UE 105a transmits any measurement of, for example, reference signal received power (RSRP) or reference signal received quality (RSRQ) (via any measurement report, for example), the eNodeB 110a uses the RSRP or RSRQ measurements to update the estimated DL_SINR. In one example embodiment, the eNodeB 110a updates the estimated DL_SINR based on a correspondence between an average DL_SINR as estimated by the UE 105a and the received RSRQ measurement shown in FIG. 20. FIG. 20 illustrates a table for updating the estimated DL_SINR based on RSRQ measurement, according to an example embodiment.

In one example embodiment, if the RSRP measurement is available instead of the RSRQ, the eNodeB 110a determines the estimated DL_SINR as a minimum of the available estimate of the DL_SINR (prior to receiving the RSRP and/or RSRQ measurements) and −4 dB, as the estimated DL_SINR value in equation (5). It should be noted that −4 dB value mentioned here is just an example and any other value as deemed appropriate based on experiments, parameter settings, and empirical studies may be used instead of −4 dB.

In one example embodiment, the updated estimate of the DL_SINR (based on the RSRP or RSRQ measurement) is also used by the eNodeB in performing the process shown in FIG. 13 for determining the PDCCH AGL.

Variations of the example embodiments are not to be regarded as a departure from the spirit and scope of the example embodiments, and all such variations as would be apparent to one skilled in the art are intended to be included within the scope of this disclosure.

What is claimed:

1. A network control node comprising:
   a memory having computer-readable instruction stored therein; and
   a processor configured to execute the computer-readable instructions to,
   determine an uplink correction parameter based on at least one of network loading conditions and a modulation coding scheme used for transmission of data packets on an uplink channel from a user equipment to the network control node, the network loading conditions being at least one of, an interference to thermal noise (IoT) value for the user equipment, and a number of active users serviced by the network control node,
   determine a target signal to interference plus noise ratio (SINR) for the user equipment based on the uplink correction parameter,
   adjust the modulation coding scheme based on the determined target SINR,
   determine a step size as one of a linear, non-linear or piecewise linear functions of at least one of a plurality of IoT values and the number of active users, and
   determine the uplink correction parameter based on the determined step size and a previous value of the uplink correction parameter.

2. The network control node of claim 1, wherein the processor is configured to execute the computer-readable instructions to,
   determine whether the network control node has transmitted an acknowledgement message (ACK) or a negative acknowledgement message (NACK) in response to the data packet received from the user equipment, and
   determine the uplink correction parameter based on whether the network control node has transmitted an ACK or a NACK and the at least one of the network loading conditions and the modulation coding scheme.

3. The network control node of claim 2, wherein if the processor determines that the network control node has transmitted an ACK, the processor is configured to execute the computer-readable instructions to determine the uplink correction parameter as a function of a step size, the step size being a function of the loading conditions.

4. The network control node of claim 2, wherein if the processor determines that the network control node has transmitted a NACK, the processor is configured to execute the computer-readable instructions to determine the uplink correction parameter as a function of a step size, the step size being a function of the loading conditions and the modulation coding scheme.

5. The network control node of claim 4, wherein the processor is configured to execute the computer-readable instructions to,
   determine a target block error rate for the user equipment,
   determine the step size based on the target block error rate, and
   determine the uplink correction parameter based on the determined step size and a previous value of the uplink correction parameter.

6. The network control node of claim 5, wherein the processor is configured to execute the computer-readable instructions to determine the target block error rate as a function of the modulation coding scheme, the modulation coding scheme being a modulation coding scheme previously assigned to the user equipment during a previous transmission of a data packet on the uplink channel.

7. The network control node of claim 4, wherein the processor is configured to execute the computer-readable instructions to,
   determine a sequence number of the NACK transmitted by the network control node to the UE in response to the data packet received on the uplink channel from the user equipment, and
   apply a corresponding weight from among a plurality of weights to the determined uplink correction parameter based on the sequence number of the NACK message.

8. The network control node of claim 1, wherein
the network node is an eNodeB, and
the uplink channel is a physical uplink shared channel (PUSCH).

9. A network control node comprising:
a memory having computer-readable instruction stored therein; and
a processor configured to execute the computer-readable instructions to,
determine a downlink correction parameter based on at least one of network loading conditions and a modulation coding scheme used for transmission of data packets on a downlink channel from the network control node to a user equipment, the network loading conditions being at least one of, an interference to thermal noise (IoT) value for the user equipment, and a number of active users serviced by the network control node,
determine a target signal to interference plus noise ratio (SINR) for the user equipment based on the downlink correction parameter,
adjust the modulation coding scheme based on the determined target SINR,
determine a step size as one of a linear, non-linear or piecewise linear functions of at least one of a plurality of IoT values and the number of active users, and
determine the downlink correction parameter based on the determined step size and a previous value of the downlink correction parameter.

10. The network control node of claim 9, wherein the processor is configured to execute the computer-readable instructions to,
determine whether an acknowledgement message (ACK) or a negative acknowledgement message (NACK) is received from the user equipment in response to the data packet transmitted to the user equipment, and
determine the downlink correction parameter based on whether the network control node has received an ACK or a NACK from the user equipment and the at least one of the network loading conditions and the modulation coding scheme.

11. The network control node of claim 10, wherein if the processor determines that an ACK has been received, the processor is configured to execute the computer-readable instructions to determine the downlink correction parameter as a function of a step size, the step size being a function of the loading conditions.

12. The network control node of claim 10, wherein if the processor determines that a NACK is received, the processor is configured to execute the computer-readable instructions to determine the downlink correction parameter as a function of a step size, the step size being a function of the loading conditions and the modulation coding scheme.

13. The network control node of claim 12, wherein the processor is configured to execute the computer-readable instructions to,
determine a target block error rate for the user equipment,
determine the step size based on the target block error rate, and
determine the downlink correction parameter based on the determined step size and a previous value of the downlink correction parameter.

14. The network control node of claim 13, wherein the processor is configured to execute the computer-readable instructions to determine the target block error rate as a function of the modulation coding scheme, the modulation coding scheme being a modulation coding scheme previously assigned for downlink transmission of a previous data packet on the downlink channel.

15. The network control node of claim 9, wherein
the downlink channel is a physical downlink control channel (PDCCH), and
the processor is configured to execute the computer-readable instructions to determine an aggregation level to be used on the PDCCH for the user equipment based on the determined target SINR and a plurality of thresholds.

16. The network control node of claim 9, wherein the processor is configured to execute the computer-readable instructions to,
detect a channel quality indication value based jointly on probability of channel quality indication values and rank values received from the user equipment,
determine an estimate of a downlink SINR corresponding to the user equipment based on the detected channel quality indication value,
determine whether at least one measurement has been received from the user equipment within a period of time from a time at which the channel quality indication value is detected,
update the estimated downlink SINR based on the at least one measurement if the processor determines that the at least one measurement has been received within the period of time, and
determine the target SINR based on the determined downlink correction parameter and at least one of the determined estimate of the downlink SINR or the updated estimate of the downlink SINR.

17. A network control node comprising:
a memory having computer-readable instruction stored therein; and
a processor configured to execute the computer-readable instructions to,
determine an uplink correction parameter based on at least one of network loading conditions and a modulation coding scheme used for transmission of data packets on an uplink channel from a user equipment to the network control node,
determine a target signal to interference plus noise ratio (SINR) for the user equipment based on the uplink correction parameter,
adjust the modulation coding scheme based on the determined target SINR,
determine whether the network control node has transmitted an acknowledgement message (ACK) or a negative acknowledgement message (NACK) in response to the data packet received from the user equipment, and
determine the uplink correction parameter based on whether the network control node has transmitted an ACK or a NACK and the at least one of the network loading conditions and the modulation coding scheme,
wherein if the processor determines that the network control node has transmitted an ACK, the processor is configured to execute the computer-readable instructions to determine the uplink correction parameter as a function of a step size, the step size being a function of the loading conditions.

18. A network control node comprising:
a memory having computer-readable instruction stored therein; and a processor configured to execute the computer-readable instructions to,
  determine a downlink correction parameter based on at least one of network loading conditions and a modulation coding scheme used for transmission of data packets on a downlink channel from the network control node to a user equipment,
  determine a target signal to interference plus noise ratio (SINR) for the user equipment based on the downlink correction parameter, and
  adjust the modulation coding scheme based on the determined target SINR,
  determine whether an acknowledgement message (ACK) or a negative acknowledgement message (NACK) is received from the user equipment in response to the data packet transmitted to the user equipment, and
  determine the downlink correction parameter based on whether the network control node has received an ACK or a NACK from the user equipment and the at least one of the network loading conditions and the modulation coding scheme,
  wherein if the processor determines that an ACK has been received, the processor is configured to execute the computer-readable instructions to determine the downlink correction parameter as a function of a step size, the step size being a function of the loading conditions.

* * * * *